(12) United States Patent
Will et al.

(10) Patent No.: US 10,957,492 B2
(45) Date of Patent: Mar. 23, 2021

(54) ELECTROLYTIC CAPACITOR

(71) Applicant: TDK Electronics AG, Munich (DE)

(72) Inventors: Norbert Will, Heidenheim (DE); Fabio Augusto Bueno de Camargo Mello, Munich (DE); Igor Peretta, Porto Alegre (BR); Emerson Almeida, Porto Alegre (BR); Moisés Coster, Porto Alegre (BR); Thales Machado, Porto Alegre (BR)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 16/090,054

(22) PCT Filed: Mar. 27, 2017

(86) PCT No.: PCT/EP2017/057211
§ 371 (c)(1),
(2) Date: Sep. 28, 2018

(87) PCT Pub. No.: WO2017/167696
PCT Pub. Date: Oct. 5, 2017

(65) Prior Publication Data
US 2019/0115161 A1 Apr. 18, 2019

(30) Foreign Application Priority Data
Mar. 29, 2016 (DE) .................... 10 2016 105 696.0

(51) Int. Cl.
*H01G 9/10* (2006.01)
*H01G 9/008* (2006.01)
(Continued)

(52) U.S. Cl.
CPC .............. *H01G 9/10* (2013.01); *H01G 9/008* (2013.01); *H01G 9/04* (2013.01); *H01G 9/08* (2013.01)

(58) Field of Classification Search
CPC  H01G 9/10; H01G 9/008; H01G 9/02; H01G 9/045; H01G 9/145; H01G 2009/0408; H01G 9/04; H01G 9/08
See application file for complete search history.

(56) References Cited

U.S. PATENT DOCUMENTS 4,702,976 A  10/1987  Bowsky et al.
4,783,723 A * 11/1988  Watanabe ................ H01G 9/02
                                                      361/502
(Continued)

FOREIGN PATENT DOCUMENTS

CN  87104849 A  5/1988
CN  1384554 A  12/2002
(Continued)

OTHER PUBLICATIONS

"Principle and technology of thermal engineering experiment," Non-patent literature document cited in the 3rd Office Action, dated Dec. 31, 1992, pp. 1-15.

*Primary Examiner* — Michael P McFadden
(74) *Attorney, Agent, or Firm* — Slater Matsil, LLP

(57) ABSTRACT

An electrolytic capacitor is disclosed. In an embodiment an electrolytic capacitor includes a housing having a base and an opening arranged opposite the base and a closure element being at least partly introduced into the opening, wherein the closure element is configured to close the housing, wherein the closure element includes a sealing element for electrically insulating a connection between closure element and housing, and wherein the closure element comprises at least
(Continued)

one first contact element for electrically conductive connecting a second contact element.

17 Claims, 5 Drawing Sheets

(51) Int. Cl.
  *H01G 9/08* (2006.01)
  *H01G 9/04* (2006.01)

(56) References Cited

U.S. PATENT DOCUMENTS

| | | |
|---|---|---|
| 5,021,927 A | 6/1991 | Schweikert et al. |
| 5,245,513 A | 9/1993 | Maijers et al. |
| 6,379,839 B1 | 4/2002 | Inoue et al. |
| 6,896,993 B2 | 5/2005 | Hozumi et al. |
| 7,095,605 B2 | 8/2006 | Suenaga et al. |
| 8,139,344 B2 | 3/2012 | Navratil et al. |
| 8,416,556 B2 | 4/2013 | Grimm et al. |
| 8,837,115 B2 | 9/2014 | Ishida |
| 2005/0225936 A1 | 10/2005 | Day |
| 2007/0014076 A1* | 1/2007 | Omura .................. H01G 9/10 361/502 |
| 2010/0104941 A1* | 4/2010 | Nakabayashi ........ H01M 2/08 429/181 |
| 2019/0115161 A1 | 4/2019 | Will et al. |

FOREIGN PATENT DOCUMENTS

| | | |
|---|---|---|
| CN | 1643627 A | 7/2005 |
| CN | 100481286 C | 4/2009 |
| CN | 101930845 A | 12/2010 |
| CN | 202275719 U | 6/2012 |
| CN | 102576612 A | 7/2012 |
| CN | 105006369 A | 10/2015 |
| DE | 3616991 A1 | 11/1987 |
| DE | 102006007300 A1 | 8/2007 |
| DE | 60033678 T2 | 12/2007 |
| DE | 102009012627 A1 | 9/2010 |
| DE | 102010044585 A1 | 3/2011 |
| EP | 0389664 A1 | 10/1990 |
| EP | 1580773 A1 | 9/2005 |
| JP | S3316566 Y | 10/1958 |
| JP | S349152 Y | 6/1959 |
| JP | S4892430 U | 11/1973 |
| JP | S49012449 U | 2/1974 |
| JP | S5258743 U | 12/1978 |
| JP | S5584867 U | 6/1980 |
| JP | S58153441 U | 10/1983 |
| JP | S59132166 U | 9/1984 |
| JP | S6039235 U | 3/1985 |
| JP | S61174737 U | 10/1986 |
| JP | S62157060 U | 10/1987 |
| JP | 2000077040 A | 3/2000 |
| JP | 2000123860 A | 4/2000 |
| JP | 2004171856 A | 6/2004 |
| JP | 2005243451 A | 9/2005 |
| WO | 0019788 A1 | 4/2000 |
| WO | 2006116967 A2 | 11/2006 |
| WO | 2017167696 A1 | 10/2017 |

* cited by examiner

ELECTROLYTIC CAPACITOR

This patent application is a national phase filing under section 371 of PCT/EP2017/057211, filed Mar. 27, 2017, which claims the priority of German patent application 10 2016 105 696.0, filed Mar. 29, 2016, each of which is incorporated herein by reference in its entirety.

TECHNICAL FIELD

The present invention relates to an electrolytic capacitor and in particular to an electrolytic capacitor of an axial design (axial electrolytic capacitor).

BACKGROUND

Electrolytic capacitors consist of at least two layers of electrode films, the anode and the cathode. A spacer impregnated with an operating electrolyte is arranged between said electrode films. In the case of aluminum electrolytic capacitors, aluminum films are used as electrodes. In general, the electrode films with the spacer situated therebetween are wound up to form a capacitor winding.

Securing elements that serve as mechanical and electrical contacting can be welded on axial electrolytic capacitors. However, it has thereby been possible hitherto only to enable the negative contacting (cathode). The positive contacting can only be effected via a wire (anode wire).

By means of suitable welded-on contact plates or contact laminae, designs such as press-fit or SMD (surface-mounted device) are possible, but hitherto only with the negative pole. The positive pole remains as a wire that has to be laboriously reworked to form a press-fit or SMD contact.

Axial electrolytic capacitors having a large-area positive pole (aluminum sheet) are known. However, since said sheet is mounted in a recessed manner, directly welding a contact plate onto the aluminum sheet, and hence an anodal contacting by means of a contact plate, is very laborious.

SUMMARY OF THE INVENTION

Embodiments provide an improved electrolytic capacitor.

In accordance with one embodiment, an electronic component, in particular an electrolytic capacitor, is specified. The electrolytic capacitor is an axial electrolytic capacitor. Particularly preferably, the electrolytic capacitor is an axial aluminum electrolytic capacitor. The electrolytic capacitor comprises a housing. The housing is of can-type configuration. The housing comprises a base and an opening situated opposite the base. The housing is configured to receive a capacitor winding.

The electrolytic capacitor comprises a closure element. The closure element comprises an electrically conductive material. Preferably, the closure element comprises a metal, for example, aluminum. The closure element is of sheet-type configuration. Particularly preferably, the closure element comprises an aluminum sheet. The closure element is shaped, for example, by a shaping process or by a bending deformation of a stamped aluminum lamina. The closure element is at least partly introduced into the opening. The closure element is configured and arranged to close, in particular to close tightly, the housing and in particular the opening. In this context, tight closing means closing whereby external influences can no longer affect an inner region of the housing. Preferably, the housing is hermetically tightly closed by the closure element.

The closure element comprises a sealing element. The sealing element comprises an electrically insulating material. The sealing element serves for an electrically insulating connection between closure element and housing. Consequently, the connection element is preferably a sealing sheet.

The sealing element is preferably arranged such that a direct mechanical contact is produced only between the sealing element and the housing. A particularly tight electrolytic capacitor having a long lifetime is provided on account of the connection between the sealing element and the housing.

The closure element can furthermore comprise an anode wire. The anode wire is arranged, for example, welded on, at an outer side of the closure element. Preferably, the anode wire is configured and arranged for providing an electrical contacting of the positive side of the electrolytic capacitor. Preferably, the anode wire is arranged only temporarily, i.e., not permanently, at the closure element. After successful electrical contacting of the positive side, the anode wire is preferably removed. In other words, during operation of the electrolytic capacitor, the anode wire is preferably not arranged at the closure element. For this reason, the anode wire can also be understood or referred to as a (temporary) welding auxiliary wire.

The closure element furthermore comprises—in addition to the anode wire—at least one contact element for electrical contacting, preferably for positive-side or anodal contacting, of the electrolytic capacitor. The contact element serves for securing a further contact element or for electrically conductive connection to the further contact element, for example, a contact plate or a contact lamina. The closure element is preferably arranged anodally at or in the housing. The anodal contacting of the electrolytic capacitor is preferably effected by the connection between the contact element of the closure element and the further contact element.

The electrically conductive connection of the closure element to the further contact element is preferably effected by means of welding. For the purpose of welding closure element and further contact element, a welding current flows proceeding from the anode wire via the closure element into the further contact element. Afterward, the anode wire can be removed, for example.

By means of the closure element—and in particular the contact element thereof—the electrolytic capacitor can be electrically contacted in a simple manner. In particular, by virtue of the closure element, a diversity of contact shapes are possible even for the anode connection. SMD, press-fit and further application-specific designs are thus possible. A particularly effective and flexibly usable electrolytic capacitor is thus provided.

In accordance with an embodiment, the closure element comprises a top side, an underside and a side region. The side region connects the top side and the underside of the closure element to one another. The sealing element is preferably arranged circumferentially at the side region of the closure element. The sealing element completely surrounds the side region. The side region constitutes a contact region for producing the connection to the housing. As a result of the side region being enveloped with the sealing element, it is possible to avoid a direct contact between the side region and the housing. An electrical insulation between the closure element and the housing is thus provided via the sealing element.

In accordance with an embodiment, the sealing element is formed at least partly at the top side and/or the underside of the closure element. A particularly well insulated capacitor having a long lifetime can thus be provided. Furthermore, the production of an electrical contact with the housing can be avoided during an electrical contacting of the closure element.

In accordance with an embodiment, the sealing element comprises rubber. By way of example, the sealing element constitutes a rubber coating.

In accordance with an embodiment, the electrolytic capacitor comprises a capacitor winding having at least one anode strip and at least one cathode strip. Byway of example, two or three anode strips are present. The closure element comprises at least one contact region, for example, two contact regions. The respective contact region faces the capacitor winding. The at least one anode strip is electrically conductively connected, for example, welded, to the contact region. A large-area positive pole of the electrolytic capacitor can be created by means of the closure element. The fitting of further contacting elements, for example, a contact plate, is thereby facilitated. A flexibly contactable and hence a flexibly usable electrolytic capacitor can thus be made available.

Preferably, the capacitor winding comprises two anode strips. Preferably, the anode strips emerge from the capacitor winding alongside one another (and not one above another) and are welded, each by themselves, alongside one another on the closure element ("flat anode double contacting"). For this purpose, the closure element can comprise two contact regions. The inductance of the electrolytic capacitor can be reduced by the corresponding arrangement of the anode strips.

In accordance with an embodiment, the contact element is configured for electrically conductive connection of the closure element to a contact plate. Preferably, the contact element is formed in ring-shaped fashion. Preferably, the contact element projects from the housing, and in particular from the opening thereof. In other words, the contact element is easily accessible from outside the housing. As a result, it is possible, particularly simply and effectively, for the closure element to be connected to the contact plate, and for the electrolytic capacitor to be contacted anodally.

In accordance with an embodiment, the electrolytic capacitor comprises at least one contact plate. Preferably, the electrolytic capacitor comprises two contact plates, one for contacting the positive side and another for contacting the negative side. One of the contact plates—the contact plate for contacting the positive side—is electrically conductively connected to the closure element via the contact element. With the aid of the closure element, a positive wire that is customary for contacting the positive side can thus be replaced by a component (contact plate) which has a larger dimensioning than the customary wire. The intrinsic inductance of the electrolytic capacitor can thus be reduced. Consequently, the capacitor can still be used effectively even at higher frequencies.

In accordance with an embodiment, the contact plate is connected to the closure element via a plurality of welding points. A particularly stable connection between contact plate and closure element and hence an electrolytic capacitor having a very long lifetime can be provided as a result. As a result of the large-area anode connection with spread dimensioning of the contact lamina, the intrinsic inductance and the intrinsic resistance of the capacitor can be reduced since a lower magnetic energy is generated for the same current.

In accordance with an embodiment, the contact plate is electrically conductively connected to the anode strip via the closure element. Preferably, the contact plate is connected to two anode strips internally, i.e., within the housing, by at least two, for example, also by three, electrically parallel welding connections. The two welding connections to the anode strips, said welding connections being arranged alongside one another internally, reduce the intrinsic inductance and the intrinsic resistance of the capacitor since a lower magnetic energy is generated for the same current. Furthermore, the anode strips are also cooled better and can withstand higher peak currents.

In accordance with an embodiment, the contact plate is configured for surface-mounting or for press-fit mounting of the electrolytic capacitor on a printed circuit board. As an alternative thereto, the contact plate can be configured for soldering or welding of the electrolytic capacitor to the printed circuit board. Preferably, the contact plate comprises at least one corresponding contacting element, for example, contacting pins. A wide variety of installation situations can be taken into account as a result. Consequently, a very more flexibly usable electrolytic capacitor is made available.

In accordance with an embodiment, the closure element comprises at least one elevation. The elevation is preferably formed at an underside of the closure element. The underside is that outer surface of the closure element which faces the capacitor winding in the installed state of the closure element. The elevation is configured and arranged for axially bracing the capacitor winding. Byway of example, the elevation is formed in ring-shaped fashion. By means of the elevation, the capacitor winding can be axially fixed in a simple and effective manner, as a result of which the vibration stability of the capacitor is increased.

In accordance with a further aspect, a method for producing and in particular for contacting an electrolytic capacitor is disclosed. Preferably, the electrolytic capacitor described above is produced by the method. All features that have been described with respect to the electrolytic capacitor also apply to the method, and vice versa. The method comprises the following steps:

providing a can-type housing having an opening; providing a capacitor winding having at least one anode strip and at least one cathode strip. Arranging the capacitor winding in the housing and electrically conductively connecting the cathode strip to the housing; providing a closure element, in particular the closure element described above. The closure element comprises the above-described sealing element and also the contact element. Furthermore, the closure element comprises the inwardly directed elevation. The closure element is provided for enlarging the anode of the electrolytic capacitor, such that an anodal contact plate can be fitted; electrically conductively connecting an anode wire to a top side of the closure element, wherein the top side of the closure element is that outer surface which faces away from the capacitor winding in the installed state of the closure element. After the contacting is completed, the anode wire is removed since it no longer has a function then. In particular, the anode wire serves for feeding energy to the closure element and to the contact plate during the production and contacting process; electrically conductively connecting the at least one anode strip to an underside of the closure element. By way of example, the anode strip is welded to a contact region at the underside. Furthermore, in the case of more than one anode strip, an arrangement can be provided in which the anode strips emerge from the capacitor winding alongside one another and are welded, each by themselves, alongside one another on the closure element. The current flow can thus flow with more spreading. In the event of momentary alternating current loading, the anode strips become hotter than the surroundings and limit the pulse current loading capacity. The more generous current carrying here leads to load relief. Furthermore, the intrinsic inductance of the capacitor is reduced as a result of the generous current carrying;

introducing the closure element into the housing under the action of force for axially bracing the capacitor winding in the housing. Preferably, in the course of this, the capacitor winding is pressed against the base of the housing by the elevation at the underside of the closure element and thus axially fixed; mechanically processing an upper partial region of the housing in order to produce a fixed connection between housing and closure element. Preferably, the upper partial region is flanged. In this case, the partial region is partly bent around the closure element, and the closure element is thus fixed to the housing. In this way, an upper end of the housing, that is to say the end at which the opening of the housing is positioned, is fixedly closed by the closure element; electrically conductively connecting the closure element to a contact plate. Preferably, the contact plate is welded to the closure element via a plurality of welding points. The welding between the closure element and the contact plate is effected by means of a welding current, which flows proceeding from the anode wire via the closure element into the contact plate. The connection of the housing base to a further contact plate for cathodal contacting is analogously effected via a cathode wire fitted for this purpose. Afterward, the anode wire/cathode wire can be removed; electrically conductively connecting the contact plate to a printed circuit board. By way of example, a press-fit connection, a soldering connection or a welding connection between contact plate and printed circuit board is produced. As an alternative thereto, the capacitor can also be mounted as an SMD device on the printed circuit board.

The electrolytic capacitor described above has a low inductance. The capacitor can thus still be used effectively even at higher frequencies. A low inductance is likewise generated as a result of the generous current carrying via the closure element. If the capacitor is axially vibrated on the printed circuit board, it has a higher vibration stability than known electrolytic capacitors on account of the sealing element. In particular, the high-frequency vibrations are damped down by the sealing element contained in this design, said sealing element having a damping function during vibration. A very effective electrolytic capacitor having a long lifetime can thus be made available.

BRIEF DESCRIPTION OF THE DRAWINGS

The drawings described below are not to be regarded as true to scale. Rather, for the sake of better illustration, individual dimensions may be illustrated in an enlarged, reduced or even distorted manner.

Elements which are identical to one another or which perform the same function are designated by identical reference signs.

In the figures:

FIG. 1 shows a sectional illustration of an electrolytic capacitor during the assembly thereof in accordance with a first embodiment;

FIG. 2 shows a sectional illustration of a closure element for an electrolytic capacitor in accordance with a first embodiment;

FIG. 3 shows a sectional illustration of a closure element for an electrolytic capacitor in accordance with a second embodiment;

FIG. 4 shows a method step during the electrical contacting of an electrolytic capacitor;

FIG. 5 shows a method step during the electrical contacting of an electrolytic capacitor;

FIG. 6 shows a method step during the electrical contacting of an electrolytic capacitor;

FIG. 7 shows a method step during the electrical contacting of an electrolytic capacitor;

FIG. 8 shows a sectional illustration of an electrolytic capacitor in accordance with a second embodiment;

FIG. 9 shows a perspective illustration of an electrolytic capacitor in accordance with an embodiment;

FIG. 10a shows a perspective illustration of an electrolytic capacitor in accordance with a further embodiment;

FIG. 10b shows a perspective illustration of an electrolytic capacitor in accordance with a further embodiment;

Figure 10A:
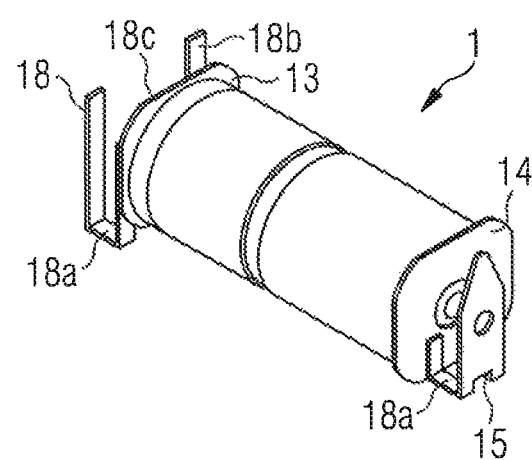
Figure 10B:
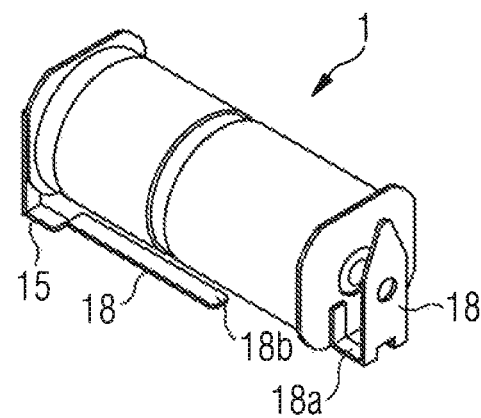
Figure 11A:
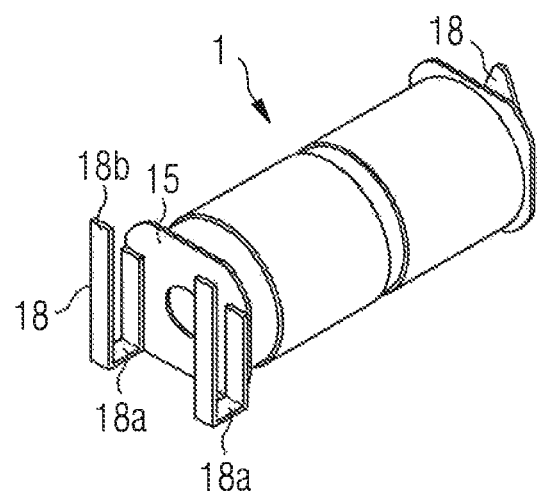
Figure 11B:
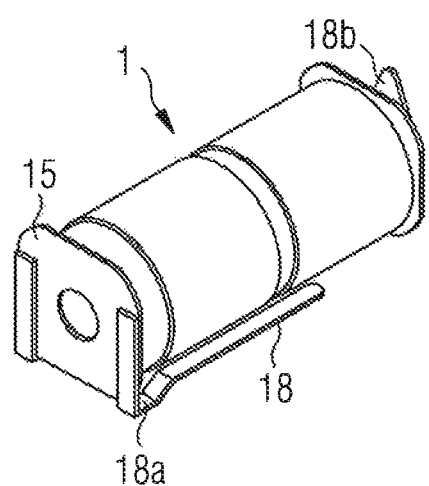
Figure 12:
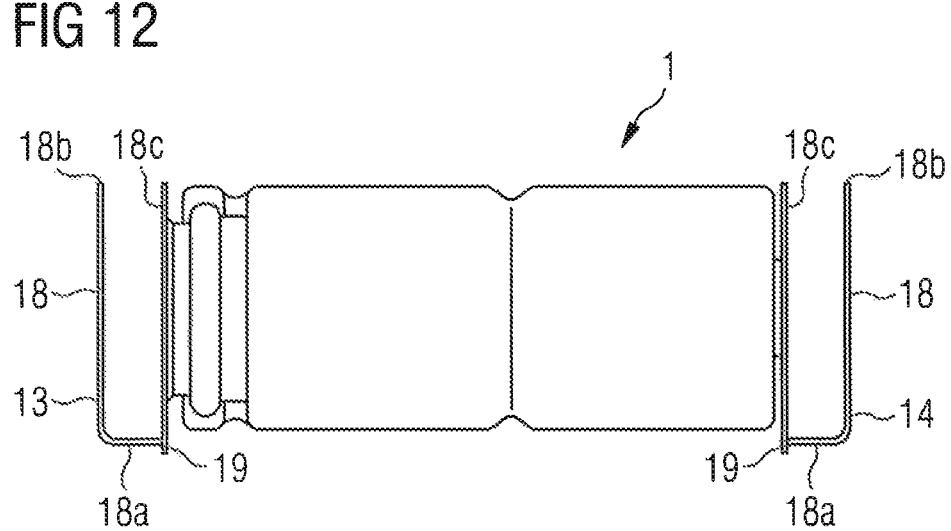

FIG. 11a shows a perspective illustration of the electrolytic capacitor in accordance with FIG. 10a;

FIG. 11b shows a perspective illustration of the electrolytic capacitor in accordance with FIG. 10b; and FIG. 12 shows a perspective illustration of an electrolytic capacitor.

DETAILED DESCRIPTION OF ILLUSTRATIVE EMBODIMENTS

Figure 1:
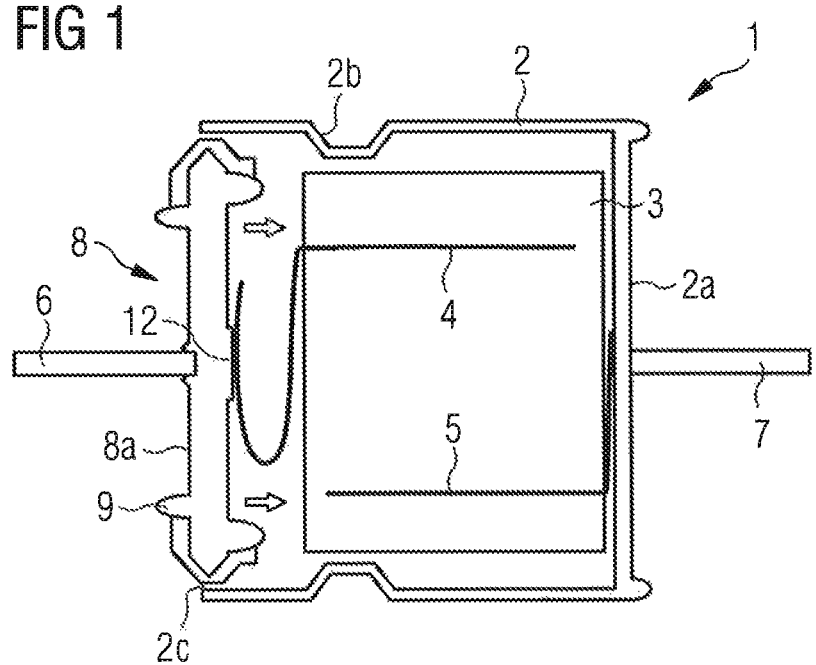

FIG. 1 shows an electrolytic capacitor 1 in accordance with a first embodiment. The electrolytic capacitor 1 is an axial capacitor, preferably an axial aluminum electrolytic capacitor. The electrolytic capacitor 1 illustrated in FIG. 1 is illustrated in a state during assembly.

The electrolytic capacitor 1 comprises a housing 2. The housing 2 is configured for receiving a capacitor winding 3. The housing 2 is of can-type configuration. In particular, the housing 2 comprises a base 2a and an opening 2c. In other words, the housing 2 is formed as open in an (upper) end region. The opening 2c is arranged opposite the base 2a. A circumferential side wall connects the base 2a of the housing 2 to the opening 2c. An indentation 2b is formed at the side wall of the housing 2. The indentation 2b is formed circumferentially at the side wall of the housing 2.

The indentation 2b is formed at a partial region or end region of the housing 2. In particular, the indentation 2 is arranged in an end region near the opening 2c of the housing 2. The indentation 2 is formed in trapezoidal fashion in this embodiment. However, other shapes of the indentation are also conceivable. By virtue of the indentation, obliquely inwardly extending partial regions of the side wall of the housing 2 are formed, which are connected to one another by a parallel extending partial region of the side wall. The indentation 2b constitutes a stop for a closure element 8, which is described in detail later.

The abovementioned capacitor winding 3 is arranged in the housing 2. As in any axial electrolytic capacitor, the current is conducted from the positive side via a narrow feedthrough and via narrow strips into the capacitor winding. The capacitor winding 3 thus comprises at least one anode strip 4, preferably two or three anode strips 4. The capacitor winding 3 comprises at least one cathode strip 5. The capacitor winding 3 is cathodally connected, for example, welded, to the base 2a of the housing 2.

For tightly closing the housing 2 and for contacting the anode in a planar manner, the electrolytic capacitor 1 comprises the abovementioned closure element 8. The closure element 8 is of sheet-type configuration. The closure element 8 comprises a metal, preferably aluminum. The closure element 8 is preferably an aluminum sheet.

Figure 2:
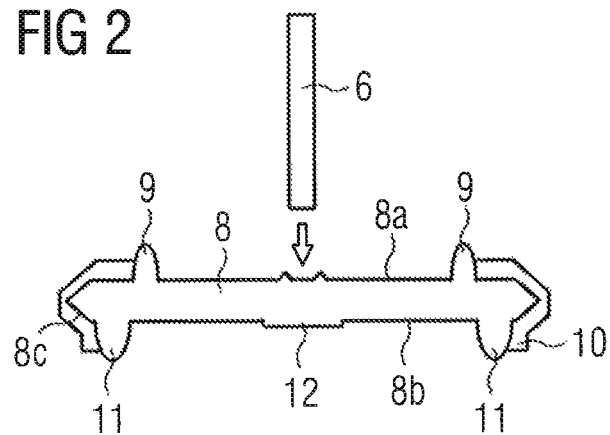

The closure element 8 comprises a top side 8a, an underside 8b and also a side region 8c (see FIG. 2). When the closure element 8 is fixedly connected to the housing 2 (see FIGS. 4 to 8, for example), the underside 8b forms that partial region or that outer surface of the closure element 8 which faces the capacitor winding 3.

The side region 8c is configured to interact with the inner side wall of the housing 2. The side region 8c of the closure element 8 tapers towards an outer side of the closure element 8. The tapering is configured to introduce the closure element 8 centrally into the housing 2.

The closure element 8 comprises a sealing element 10. The sealing element 10 comprises rubber. Preferably, the sealing element 10 is a rubber coating. The sealing element 10 serves for electrical insulation between the closure element 8 and the housing 2. The sealing element 10 is furthermore configured to fixedly close the housing 2 and thus to protect the inner region of the housing 2 against external influences. The sealing element 10 is furthermore provided to take up (or to absorb) energy during vibration of the capacitor and thus to preserve welding locations, which are typically a weak point during vibration.

The sealing element 10 is formed in particular in the side region 8c of the closure element 8. However, the sealing element 10 also projects partly onto the top side 8a and/or the underside 8b of the closure element 8. The sealing element 10 has a tapering profile shape. In particular, the sealing element 10 tapers in a radial direction toward the outer side of the closure element 8. By virtue of the tapering profile shape of the sealing element 10, the closure element 8 can be introduced and thus installed centrally in the housing 2. Once the closure element 8 has been fixedly connected to the housing 2 (see FIGS. 4 to 8, for example), then a partial region of the sealing element 10 bears against the indentation 2b, in particular against the oblique region of the side wall. The indentation 2b defines an end position for the closure element 8, as far as which the closure element 8 is introduced into the housing 2.

The closure element 8 furthermore comprises an elevation 11. As an alternative thereto, however, the closure element 8 can also comprise a plurality of elevations 11. The elevation 11 is preferably formed in ring-shaped fashion. The elevation is formed at the underside 8b of the closure element 8. When the closure element 8 is introduced into the housing 2, the elevation 11 makes direct mechanical contact with the capacitor winding 3 (see FIGS. 4 to 8). The axial bracing of the capacitor winding 3 in the housing 2 occurs as a result. In other words, the elevation 11 presses the capacitor winding 3 onto its place on the base 2b of the housing 2.

The elevation 11 gives rise to an intermediate region between one end of the capacitor winding 3 and the underside 8b of the closure element 8. The anode strips 4 find space in said intermediate region. The closure element 8 comprises a contact region 12. The latter is formed at the underside 8b. Preferably, the contact region 12 constitutes a planar elevation on the underside 8b of the closure element 8. In the contact region 12, the at least one anode strip 4 is electrically conductively and mechanically connected, for example, welded, to the closure element 8.

The closure element 8 furthermore comprises a structure, in particular a contact element 9, on the top side 8a. In other words, the closure element 8 comprises an outer profile structure. The profile structure is formed at a surface of the closure element 8 which faces away from the housing 2. The closure element 8 can also comprise a plurality of contact elements 9, for example, two, three or four contact elements 9. In this embodiment, the contact element 9 is formed in ring-shaped fashion. The contact element 9 constitutes in particular a ring-shaped elevation that projects from the top side 8a of the closure element 8. After the tight connection of closure element 8 and housing, the contact element 9 also projects from the upper end of the housing 2, as is evident, for example, from FIG. 4. The contact element 9 is in direct contact with the sealing element 10. In particular, the sealing element 10 surrounds the contact element 9 at least in partial regions.

The contact element 9 is configured for mechanical and electrically conductive connection to a contact plate 13 (see FIGS. 5 to 8, for example) for the anodal electrical contacting of the electrolytic capacitor 1. Consequently, the use of a contact plate 13 as positive contact can be made possible by the contact element 9 of the closure element 8. The contact plate 13 enables the contacting of the electrolytic capacitor 1 to a printed circuit board by means of press-fit, SMD contacts, soldering or welding contacts, as will also be described in detail later.

The production of the electrolytic capacitor 1 and the contacting thereof are described below in conjunction with FIGS. 1 and 4 to 8. All features that have been described in conjunction with the construction of the electrolytic capacitor 1 are also applicable to the method described below, and vice versa.

Firstly, the can-type housing 2 is provided. The capacitor winding 3 is introduced into the housing 2, and the cathode strip 5 is electrically conductively connected to the base 2a of the housing 2. By way of example, the cathode strip 5 is welded to the base 2a. Consequently, the cathode strip 5 is galvanically connected to the housing 2.

For the electrical contacting of the cathode, the base 2b, in particular an outer side of the base 2, is provided with a cathode wire 7. The cathode wire 7 essentially serves for producing the contacting and is removed after successful contacting of the electrolytic capacitor 1.

Figure 3:
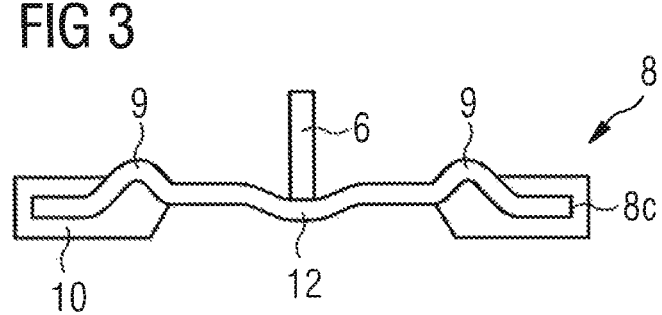

In a further step, the closure element 8 described above is provided. The closure element 8 can be shaped, for example, by a shaping process, e. g. extrusion. This has the advantage that the above-described profile structures (elevation 11, contact element 9) can be formed both on the top side 8a and on the underside 8b. As an alternative thereto, however, the closure element 8 can also be shaped from a bending deformation of a stamped aluminum lamina (see FIG. 3).

The closure element 8, in particular the top side 8a thereof, is electrically conductively connected to an anode wire 6 (see FIG. 2). By way of example, the anode wire 6 is welded to the top side 8a. The anode wire 6 is primarily required for contacting during the production process. After the contacting is concluded, the anode wire 6 is also removed (see FIG. 8).

In a further step, the at least one anode strip 4 is electrically conductively connected, for example, welded, to the closure element 8, in particular to the contact region 12 at the underside 8b of the closure element 8. By way of example, in the course of this, exactly one anode strip 4 is connected to a contact region 12 (see FIGS. 1 and 4 to 6, for example).

Figure 7:
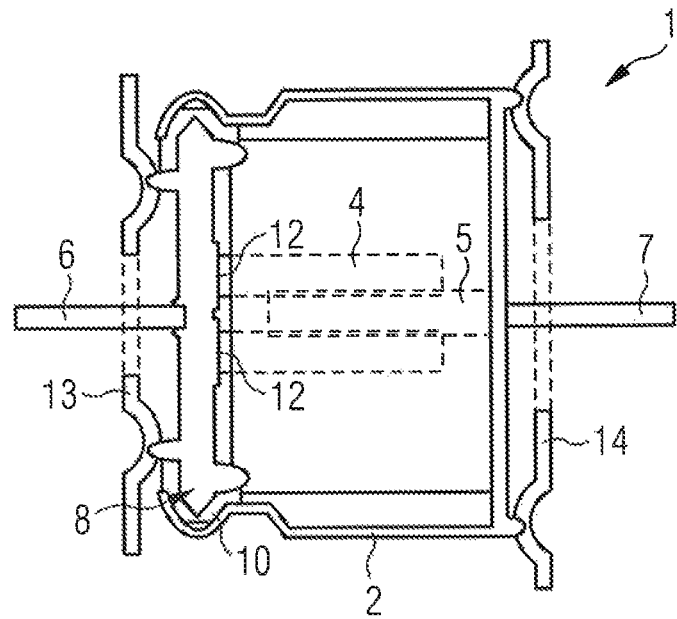
Figure 8:
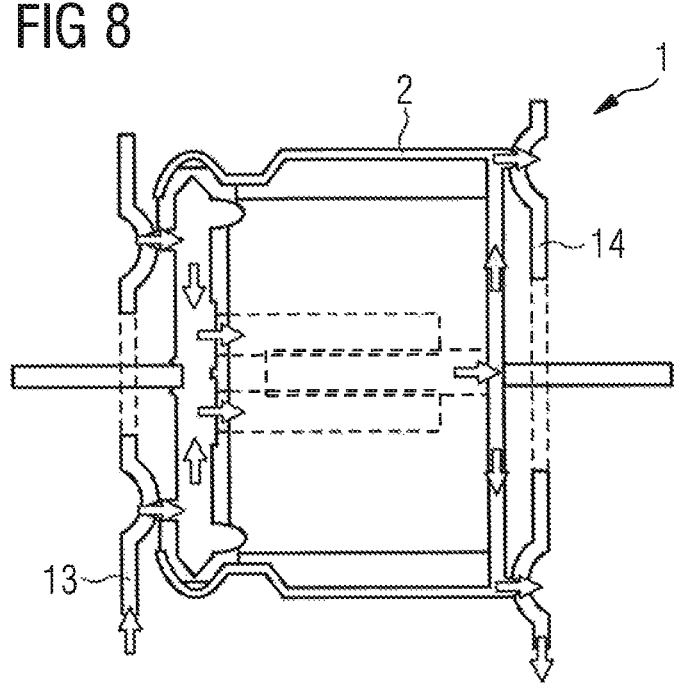

In order to reduce the inductance in the electrolytic capacitor 1, however, the closure element 8 can also be used for a "flat anode double contacting". Normally, in the case of a double contacting, the anode strips 4 arranged one above another emerge from the capacitor winding 3 and are welded as a "double pack" onto the feedthrough. In the case of the flat arrangement, they emerge from the capacitor winding 3 alongside one another and are welded, each by themselves, alongside one another on the closure element 8. For this purpose, the closure element 8 comprises two contact regions 12 (see FIGS. 7 and 8; for illustration purposes, the electrolytic capacitor 1 in FIGS. 7 and 8 is rotated by 90° in comparison with the illustrations in FIGS. 1 and 4 to 6). The current flow can thus flow with more spreading. The inductance of the electrolytic capacitor 1 is thus lower. For this case, FIG. 8 shows an example with the charging current. As a result of the larger effective surface of the anode strips 4, the heat can be better dissipated to the surroundings. The electrolytic capacitor 1 can thus be loaded momentarily with a higher current. In addition, the lower inductance brings about a lower resistance ESR in the frequency range of 10 kHz to 100 kHz since the currents are influenced by the inductance to a lesser extent and can thus flow with lower resistance.

In a further step, the closure element 8 is introduced into the housing 2. The closure element 8 is introduced into the housing 2 with the underside 8b ahead until the side region 8c, and in particular the sealing element 10, reaches a stop by striking the indentation 2b of the housing 2. The introduction of the closure element 8 takes place under the action of force, such that the capacitor winding 3 is pressed against the base 2a of the housing 2 by the elevation 11 and is thus axially braced in the housing 2. The vibration stability of the electrolytic capacitor 1 is increased as a result. By virtue of the tapering profile shape of the sealing element 10, the closure element 8 is guided and thus installed centrally in the housing 2. The anode wire 6 is thus also arranged more centrally. This enables the electrolytic capacitor 1 to be installed in the desired application with a more accurate fit.

Figure 4:
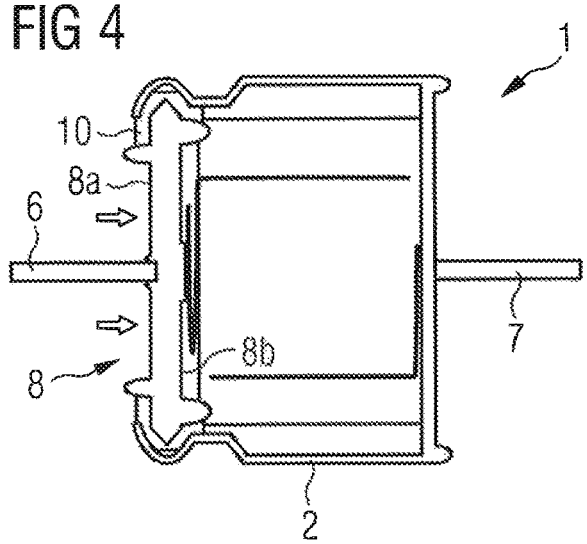
Figure 5:
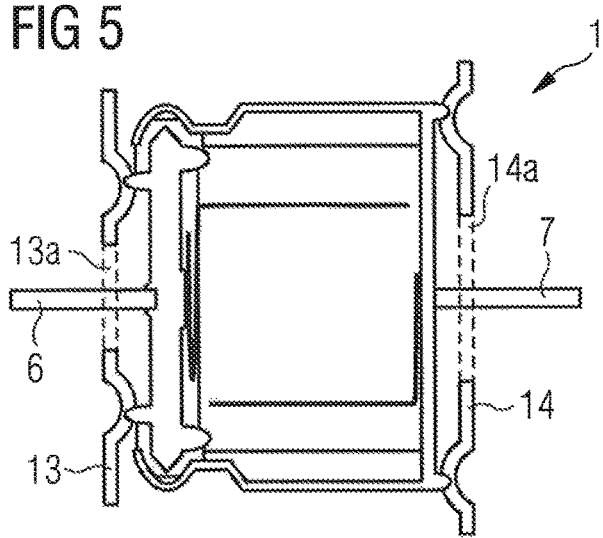

Afterward, an upper partial region of the housing 2 is flanged in order to fixedly close the housing 2 of the electrolytic capacitor 1. That partial region of the housing 2 which directly adjoins the indentation 2b toward the open end 2c of the housing 2 is in this case bent around the side region 8c of the closure element 8 (FIG. 4). After this closing process, the housing 2 bears only against the sealing element 10 of the closure element 8. A direct contact between the housing 2 and the metal of the closure element 8 is thus avoided. The sealing element 10 serves as electrical insulation (closure element 8 is connected to the anode, the housing 2 to the cathode).

A next step involves providing a contact plate 14 for cathodal contacting. The contact plate 14 has a cutout 14a for guiding through the cathode wire 7. The contact plate 14 is welded to the base 2a of the housing 2, as will later be described in greater detail.

Furthermore, a contact plate 13 for anodal contacting is provided. The contact plate 13 has a cutout 13a for guiding through the anode wire 6. The contact plate 13 is welded to the closure element 8. In particular, the contact plate 13 is welded to the contact element 9, which projects from the upper end of the housing 2 closed by the closure element 8.

Figure 6:
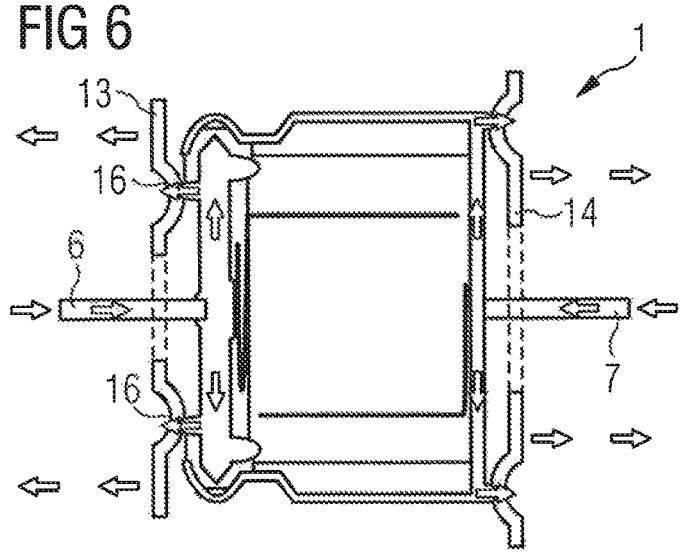

The welding is effected by means of a welding current, which flows proceeding from the anode wire 6 and cathode wire 7, respectively, via the closure element 8 and the base 2b, respectively, into the respective contact plate 13, 14 (see FIG. 6). Each contact plate 13, 14 itself is contacted with an electrode. Unlike in the case of a conventional wire contacting of the positive side, the contact plate 13 is electrically contacted with the closure element 8 by means of a plurality of points (welding points 16 in FIG. 6). After the welding-on, anode wire 6 and cathode wire 7 are removed since they no longer have a function.

Finally, the contact plate 13, 14 is electrically conductively connected to a printed circuit board (not explicitly illustrated). Preferably, the contact plates 13, 14 comprise contacting elements 15 toward the printed circuit board (see FIGS. 9, 10a, 10b, 11a, 11b and 12).

Figure 9:
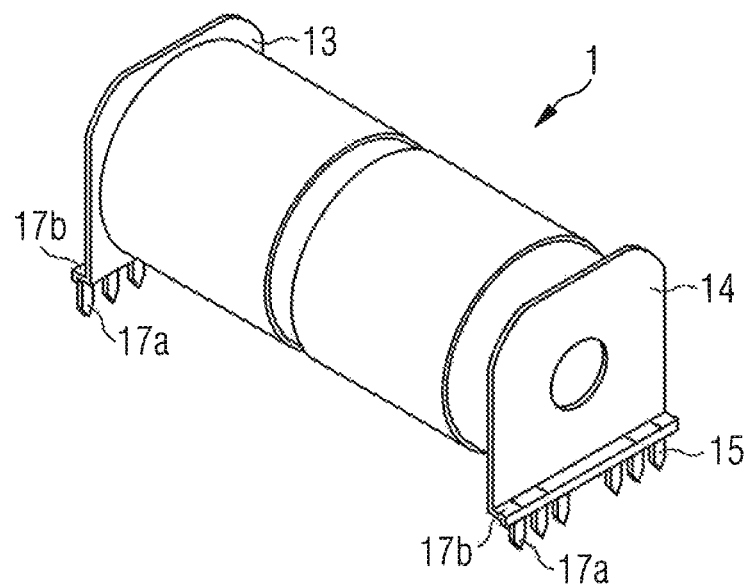

By way of example, the contact plates 13, 14 can comprise, toward the printed circuit board, press-fit pins 17a for press-fitting and, above said pins 17a, small areas 17b for pressing (force introduction for the press-fit process) (see FIG. 9). The contact plates 13, 14 can be fashioned such that they satisfy the individual requirements of an application/installation situation. By way of example, the number of contact pins 17a and/or the size of the area 17b are/is selectable.

However, the contact plates 13, 14 can also be soldered or welded to the printed circuit board. The contact plates 13, 14 can comprise soldering pins for soldering (wave soldering or crucible soldering) on the side toward the printed circuit board. The contact plates 13, 14 can comprise pins for welding (electrical or autogenous welding) on the side toward the printed circuit board. Here, too, the number of pins is selectable depending on the installation situation and the application.

In order to realize an SMD device, the contact plates 13, 14 must have a specific configuration. A corresponding configuration is described, for example, in the document DE 10 2009 012 627 A1 which is hereby explicitly incorporated by reference in the content of this disclosure.

The basic concept here is that the heat flowing away from soldering surfaces to the electrolytic capacitor 1 (during reflow soldering) is compensated for by additional surfaces and is fed rapidly enough to the soldering surfaces. As a result of this rapid feeding of heat, momentary heat profiles which were originally developed for small components are sufficient. As a result of the only short heating time, the sensitive electrolyte in the thermally sluggish capacitor body is not thermally overloaded.

For this purpose, the respective contact plate 13, 14, in particular the contacting element 15 thereof, has a lengthened connection region 18 (FIGS. 10a, 10b, 11a, 11b and 12). The lengthened connection region 18 is configured in such a way that a central region 18a of the lengthened connection region 18 is connected to conductor tracks on the printed circuit board in the region 19 of a soldering connection (see FIG. 12). A free end 18b of the lengthened connection region 18 extends beyond the soldering connection. The region between the free end 18b and the central region 18a is preferably at a distance from a further region 18c of the contact plate 13, 14, which further region bears directly on the closure element 8/the base 2b. As a result, a direct thermal bridge from the free end 18b to the electrolytic capacitor 1 is not present. By virtue of the lengthened connection region 18, heat is guided to the soldering connection location during the reflow soldering process, wherein only a small proportion of the heat passes via the further region 18c into the interior of the electrolytic capacitor 1. As a result, the capacitor winding 3 arranged in the interior of the housing 2 is not heated to an excessively great extent.

In this case, FIGS. 10a, 11a and 12 show a lengthened connection region 18 in which the region between free end 18b and central region 18a extends perpendicularly to the principal axis (longitudinal axis) of the electrolytic capacitor 1. In FIGS. 10b and 11b, the region between free end 18b and central region 18a extends parallel to the principal axis (longitudinal axis) of the electrolytic capacitor 1. It is evident from FIGS. 10a to 12 that the SMD electrolytic capacitors stand on the printed circuit board in a defined manner with three "stand-offs". The soldering regions 19 are arranged closely alongside, and therefore at a well-defined distance from the printed circuit board of approximately 0.2 mm. The soldering regions 19 are readily visible and thus automatically checkable.

The description of the subjects specified here is not restricted to the individual specific embodiments. Rather, the features of the individual embodiments can be combined —insofar as technically expedient—arbitrarily with one another.

The invention claimed is:

1. An electrolytic capacitor comprising:
   a housing comprising a base and an opening arranged opposite the base;
   a closure element being at least partly introduced into the opening, the closure element being configured to close the housing;
   a sealing element of the closure element, the sealing element providing an electrically insulating connection between the closure element and the housing;
   at least one first contact element of the closure element, the at least one first contact element providing an electrically conductive connection to
      a first contact plate for anodal contacting, the first contact plate being welded to the closure element; and
      a second contact plate for cathodal contacting, the second contact plate being welded to the base of the housing,
   wherein the first and second contact plates are arranged outside the housing, and
   wherein an area of the first and second contact plates is larger than the base of the housing.

2. The electrolytic capacitor according to claim 1, wherein the closure element comprises a top side, an underside and a side region, and wherein the sealing element is arranged circumferentially at the side region of the closure element.

3. The electrolytic capacitor according to claim 2, wherein the sealing element is formed at least partly at the top side and/or the underside of the closure element.

4. The electrolytic capacitor according to claim 1, wherein the sealing element comprises rubber.

5. The electrolytic capacitor according to claim 1, further comprising a capacitor winding comprising at least one anode strip and at least one cathode strip, wherein the closure element comprises at least one contact region, and wherein the at least one anode strip is electrically conductively connected to the contact region.

6. The electrolytic capacitor according to claim 5, wherein the closure element comprises at least one elevation, wherein the elevation is formed at an underside of the closure element, and wherein the elevation is configured and arranged for axially bracing the capacitor winding.

7. The electrolytic capacitor according to claim 6, wherein the elevation is formed in ring-shaped fashion.

8. The electrolytic capacitor according to claim 1,
   wherein the first contact element is formed in ring-shaped fashion, and
   wherein the first contact element at least partly projects from the housing.

9. The electrolytic capacitor according to claim 1, wherein the first contact plate is connected to the closure element via a plurality of welding points.

10. The electrolytic capacitor according to claim 1, wherein the closure element is shaped by a shaping process or by a bending deformation.

11. The electrolytic capacitor according to claim 1, wherein the closure element comprises an aluminum sheet.

12. The electrolytic capacitor according to claim 1, wherein the first contact plate is electrically conductively connected to an anode strip via the closure element.

13. The electrolytic capacitor according to claim 1, wherein the first contact plate is electrically conductively connected to two anode strips by at least two electrically parallel welding connections.

14. The electrolytic capacitor according to claim 1, wherein the first contact plate is configured for surface mounting of the electrolytic capacitor on a printed circuit board.

15. The electrolytic capacitor according to claim 1, wherein the first contact plate is configured for press-fit mounting of the electrolytic capacitor on a printed circuit board.

16. The electrolytic capacitor according to claim 1, wherein the first contact plate is configured for soldering of the electrolytic capacitor to a printed circuit board.

17. The electrolytic capacitor according to claim 1, wherein the first contact plate is configured for welding of the electrolytic capacitor to a printed circuit board.

\* \* \* \* \*